United States Patent
Kambe

(10) Patent No.: US 10,962,779 B2
(45) Date of Patent: Mar. 30, 2021

(54) DISPLAY CONTROL DEVICE, METHOD FOR CONTROLLING DISPLAY CONTROL DEVICE, AND STORAGE MEDIUM

(71) Applicant: SHARP KABUSHIKI KAISHA, Sakai (JP)

(72) Inventor: Tatsuya Kambe, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/485,005

(22) PCT Filed: Dec. 18, 2017

(86) PCT No.: PCT/JP2017/045266
§ 371 (c)(1),
(2) Date: Aug. 9, 2019

(87) PCT Pub. No.: WO2018/150711
PCT Pub. Date: Aug. 23, 2018

(65) Prior Publication Data
US 2020/0041789 A1 Feb. 6, 2020

(30) Foreign Application Priority Data
Feb. 15, 2017 (JP) .................. JP2017-026283

(51) Int. Cl.
*G02B 27/01* (2006.01)
*H04N 5/232* (2006.01)
*H04N 5/74* (2006.01)

(52) U.S. Cl.
CPC ....... *G02B 27/017* (2013.01); *G02B 27/0101* (2013.01); *H04N 5/232* (2013.01); *H04N 5/7491* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 5,742,264 A | 4/1998 | Inagaki et al. | |
| 2011/0122265 A1 | 5/2011 | Oryoji | |
| 2016/0188277 A1 | 6/2016 | Miyasaka et al. | |
| 2016/0344934 A1* | 11/2016 | Kato | G06F 3/013 |
| 2017/0232343 A1* | 8/2017 | Yoshioka | A63F 13/5258 463/31 |

FOREIGN PATENT DOCUMENTS

| | | |
|---|---|---|
| JP | H08-292394 A | 11/1996 |
| JP | 2011-114407 A | 6/2011 |
| JP | 2011-114684 A | 6/2011 |
| JP | 2012-080355 A | 4/2012 |
| JP | 2016-126365 A | 7/2016 |

* cited by examiner

*Primary Examiner* — Brian M Butcher
(74) *Attorney, Agent, or Firm* — ScienBiziP, P.C.

(57) ABSTRACT

An object is to allow a user to watch a moving image more comfortably. A control section (20) includes: a displayed area correcting section (25) configured to make a correction of a location of a displayed area in a whole image so as to follow a specific subject contained in the moving image; and a follow-degree deciding section (24) configured to decide, in accordance with a displacement of the specific subject per unit time, a degree to which the specific subject is followed in the correction.

7 Claims, 6 Drawing Sheets

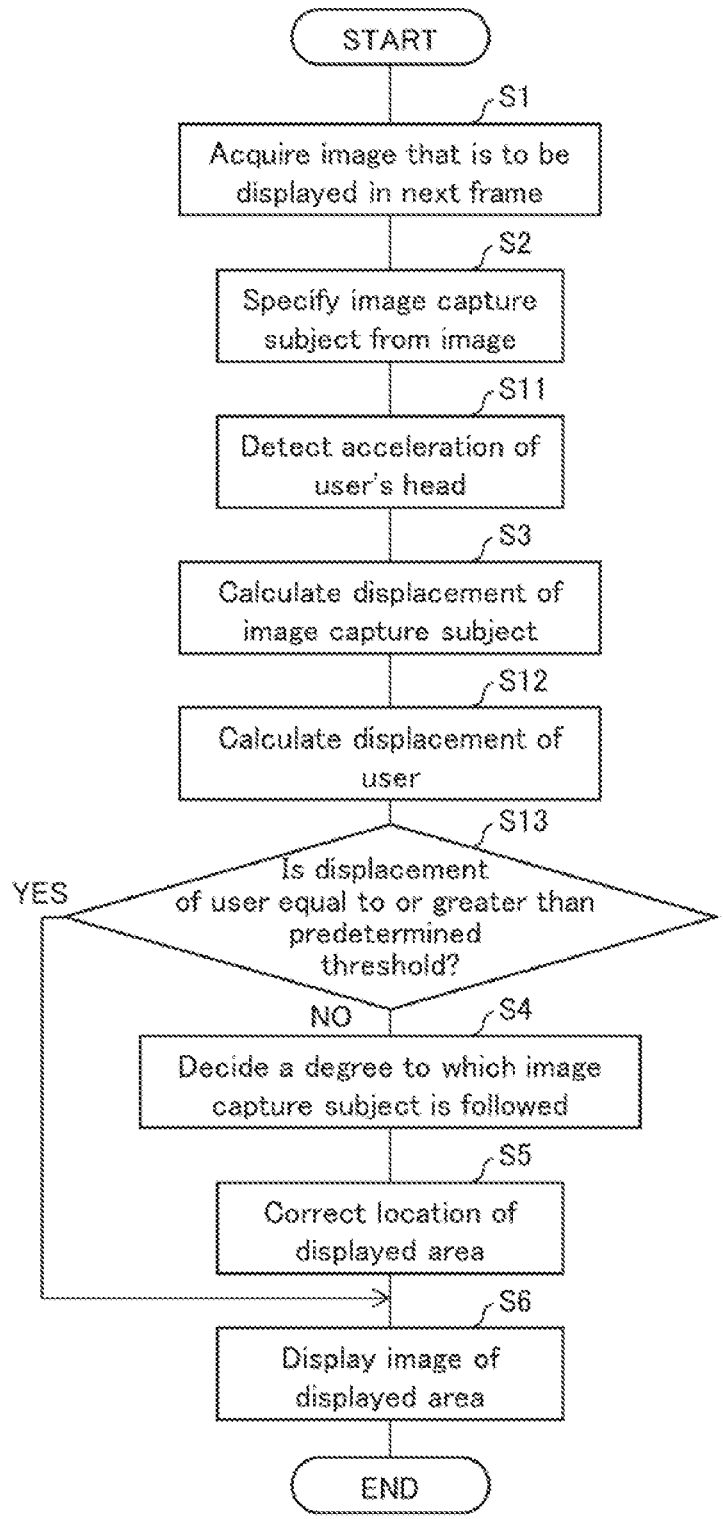

DISPLAY CONTROL DEVICE, METHOD FOR CONTROLLING DISPLAY CONTROL DEVICE, AND STORAGE MEDIUM

TECHNICAL FIELD

The present invention relates to, for example, a display control device that controls a display section to display a moving image.

BACKGROUND ART

A technique by which a moving image with a wide angle of view is prepared in advance and a partial area of the moving image is displayed on a display section has been developed. For example, in a case of a head-mounted display, a partial area, which corresponds to a user's field of view, of a moving image with a wide angle of view (e.g., 360-degree all-around image) is a "displayed area" that is actually displayed on the display. Patent Literature 1 discloses a head-mounted image display device that displays images as intended by a user by deciding which image range to generate next in accordance with information on the position of the head of the user and information on rotation of the head of the user.

Independently of the above-described technique, there is also an image stabilization (blur correction) technique for moving images. This technique is to crop frame images of a moving image such that a certain subject contained in the moving image appears substantially at the same location. According to this technique, even if the location of the subject in the frame images changes due to shaky hands, the subject appears substantially at the same location in cropped images. Displaying these cropped images achieves displaying the original moving image with blur corrected.

CITATION LIST

Patent Literature

[Patent Literature 1]
Japanese Patent Application Publication, Tokukaihei, No. 8-292394 (Publication date: Nov. 5, 1996)

SUMMARY OF INVENTION

Technical Problem

Under such circumstances, there is a demand that the image stabilization be applied also to a moving image with a wide angle of view. When displaying an extracted part of a moving image with a wide angle of view as described above, however, it is difficult to simply employ the conventional image stabilization technique. This is because, in cases of a moving image with a wide angle of view, a subject serving as a reference for correction is followed to an excessive degree.

Specifically, assume that a moving image has a narrow angle of view (e.g., 120°). In this case, when a subject serving as a reference for correction moves a great distance within the moving image, the subject will go out of the frame. That is, it is not possible to carry out correction so that something that does not exist in the original moving image will be contained in a display range. In consequence, in the case of the moving image with a narrow angle of view, the subject serving as a reference for correction is not followed to an excessive degree.

On the contrary, assume that a moving image has a wide angle of view. In this case, even if the subject moves a great distance, the subject will not go out of the frame in many cases. Especially in a case of an all-around image, the subject will be located within the moving image regardless of where the subject moves to. Therefore, if the conventional image stabilization technique is simply applied to a moving image with a wide angle of view, the subject serving as a reference for correction is followed to an excessive degree. In addition, if such images resulting from excessive following (that is, images corrected to an excessive degree) are displayed as corrected frame images, unnatural video will result instead and/or some users may suffer from digital motion sickness.

In view of the above issue, it is an object of an aspect of the present invention to achieve, for example, a display control device that allows a user to watch a moving image more comfortably.

Solution to Problem

In order to attain the above object, a display control device in accordance with an aspect of the present invention is a display control device for controlling a display section to display a part of a frame image of a moving image, the part being used as a displayed area, the display control device including: a displayed area correcting section configured to make a correction of a location of the displayed area in the frame image so as to follow a specific subject contained in the moving image; and a follow-degree deciding section configured to decide, in accordance with a displacement of the specific subject per unit time in the moving image, a degree to which the specific subject is followed in the correction made by the displayed area correcting section.

In order to attain the above object, a method of controlling a display control device in accordance with another aspect of the present invention is a method of controlling a display control device that is configured to control a display section to display a part of a frame image of a moving image, the part being used as a displayed area, the method including: a displayed area correcting step including making a correction of a location of the displayed area in the frame image so as to follow a specific subject contained in the moving image; and a follow-degree deciding step including deciding, in accordance with a displacement of the specific subject per unit time in the moving image, a degree to which the specific subject is followed in the correction made in the displayed area correcting step.

Advantageous Effects of Invention

An aspect of the present invention allows a user to watch a moving image more comfortably.

BRIEF DESCRIPTION OF DRAWINGS

FIG. 6 is a flowchart showing an example of a flow of processes carried out by the head-mounted display.

DESCRIPTION OF EMBODIMENTS

Embodiment 1

Figure 1:
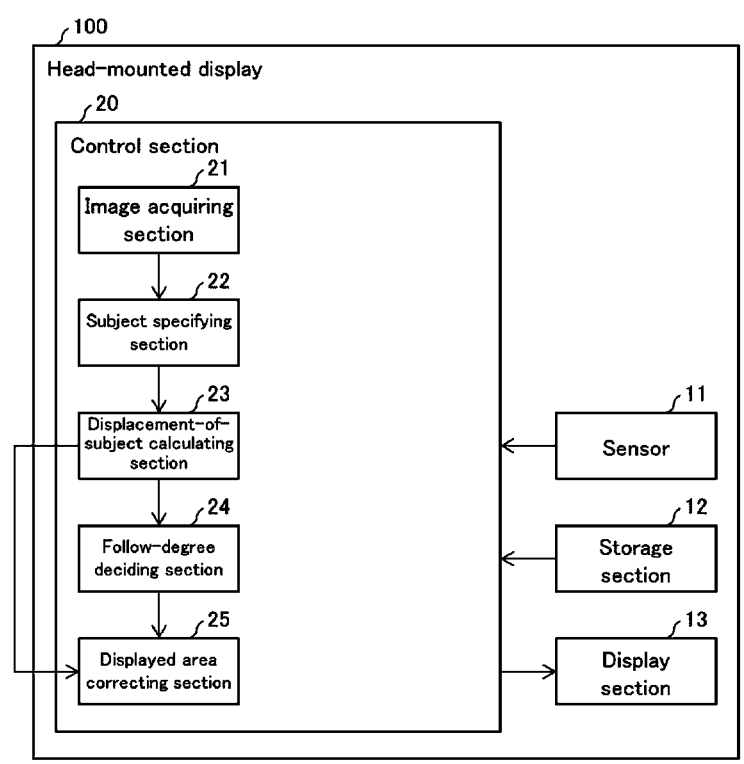
FIG. 1 is a block diagram illustrating an example configuration of main parts of a head-mounted display in accordance with Embodiment 1 of the present invention.
Figure 2:
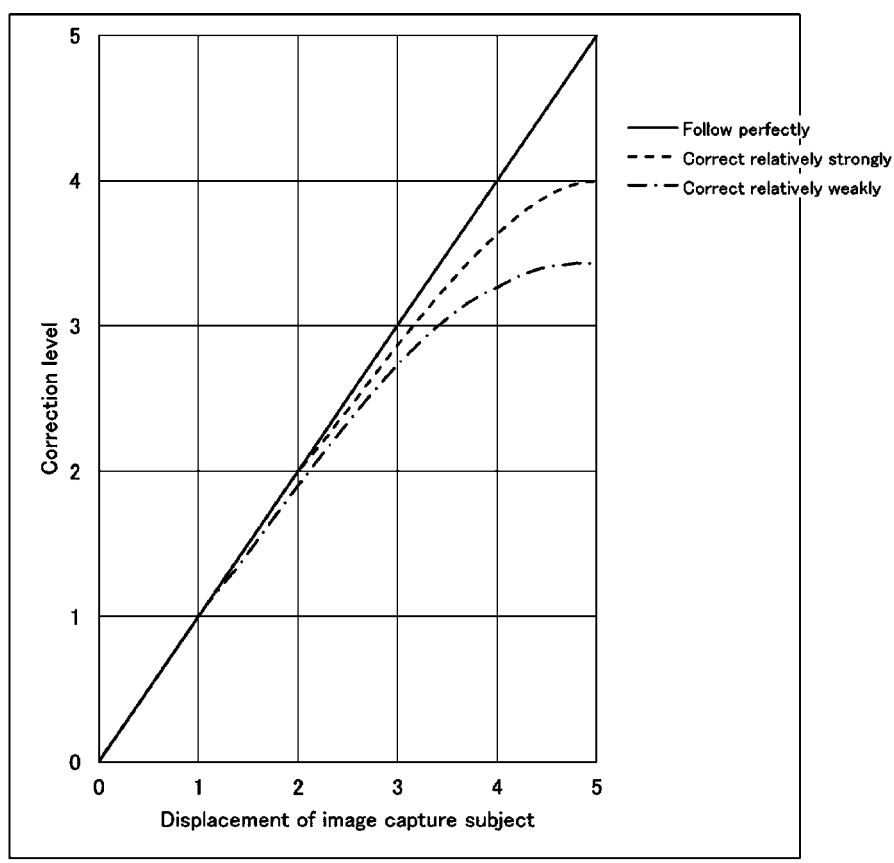
FIG. 2 is a chart showing correlations between displacement of an image capture subject and correction level for a displayed area.
Figure 3:
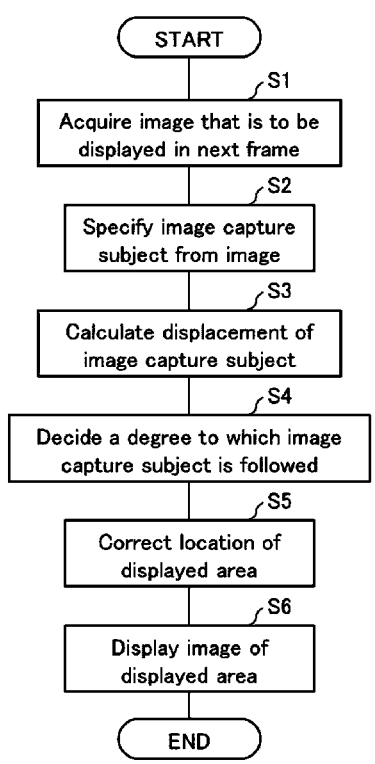
FIG. 3 is a flowchart showing an example of a flow of processes carried out by the head-mounted display.

The following description will discuss Embodiment of the present invention in detail with reference to FIGS. 1 to 3.

(Configuration of Head-Mounted Display)

FIG. 1 is a block diagram illustrating an example configuration of main parts of a head-mounted display (HMD) 100.

The HMD 100 is a device that is worn on the head of a user and that displays a moving image corresponding to the user's movement. The HMD 100 displays a partial area, which corresponds to the user's movement, of a whole image in each frame of a moving image with a wide angle of view (e.g., 360°). The partial area, which is displayed in a frame by the HMD 100 (more specifically, by a display section 13 which will be described later), is hereinafter referred to as a "displayed area".

Note that, in Embodiment 1, the HMD 100 is not particularly limited as to its specific size, shape, and the like. The HMD 100 includes a sensor 11, a storage section 12, a display section 13, and a control section 20. The HMD 100 can be a device that displays, in real time, video captured by a camera external to the HMD 100 or a camera contained in the HMD 100 (not illustrated).

The sensor 11 detects information indicative of movement (movement, orientation, or tilt of the head) of the user who wears the HMD 100. The sensor 11 can be, for example, an accelerometer that measures the acceleration of the moving head of the user. The result of detection by the sensor 11 is sent to the control section 20.

The storage section 12 stores various data for use in the HMD 100. For example, the storage section 12 stores data of a moving image to be displayed on the display section 13. The storage section 12 may also store the following data and/or the like together with the data of the moving image: data related to setting of an image capture subject (described later); and data related to calculation of a displacement (the amount of change in location) of the image capture subject.

The display section 13 displays a moving image. The display section 13 in accordance with Embodiment 1 is not particularly limited as to its configuration, provided that the display section 13 is capable of displaying frame images prepared by the control section 20. The display section 13 is preferably configured such that, when the HMD 100 is worn by the user, the moving image can be displayed so as to entirely cover the user's field of view.

The control section 20 serves to carry out an overall control of various sections of the HMD 100. The control section 20 includes an image acquiring section 21, a subject specifying section 22, a displacement-of-subject calculating section 23, a follow-degree deciding section 24, and a displayed area correcting section (displayed area deciding section) 25.

The image acquiring section 21 reads data of a moving image from the storage section 12. In a case where the HMD 100 is a device that displays real-time video captured by a camera, the image acquiring section 21 acquires data of captured video from the camera (not illustrated). Note that a point(s) in time at which the image acquiring section 21 acquires the data of the moving image or the data of the captured video can be set to any point(s) in time. Furthermore, the duration of data that is acquired by the image acquiring section 21 can be set to any duration. For example, the image acquiring section 21 can read one-frame-long data of the moving image from the storage section 12 or can read one-second-long or ten-second-long data of the moving image from the storage section 12. The image acquiring section 21 transmits the thus-acquired data of the moving image to the subject specifying section 22.

The subject specifying section 22 specifies an image capture subject contained in the moving image received from the image acquiring section 21. As used herein, the "image capture subject" refers to a specific subject that is contained in the moving image and whose location serves as a reference for correction of a displayed area by the displayed area correcting section 25 (described later). The subject specifying section 22 can be arranged to specify, as a target area serving as a reference for the correction, a certain area of a frame image of a moving image, and deal with the target area in the same manner as the image capture subject. The image capture subject can be pre-set by the HMD 100 or by an external device or can be set by the subject specifying section 22 based on one or more frame images of the moving image. For example, the subject specifying section 22 can be arranged to detect a person contained in the moving image by a face authentication technology and set the person as the image capture subject. Alternatively, the subject specifying section 22 can be arranged to detect a specific subject contained in a central area of the moving image and set the detected subject as the image capture subject.

The displacement-of-subject calculating section 3 calculates a displacement per unit time and a displacement direction of the image capture subject specified by the subject specifying section 22. The unit time here can be set as appropriate, provided that the displayed area correcting section 25 (described later) is capable of appropriately making a correction based on the displacement per this unit time. Embodiment 1 is based on the assumption that the displacement-of-subject calculating section 23 calculates the displacement of the image capture subject over one (1) frame period and the displacement direction of the image capture subject. Specifically, the displacement-of-subject calculating section 23 calculates the displacement between (i) the location of an image capture subject in one frame image of a moving image and (ii) the location of the image capture subject in another frame image that is immediately subsequent to the one frame image. The displacement-of-subject calculating section 23 transmits, to the follow-degree deciding section 24, information indicative of the displacement thus calculated. The displacement-of-subject calculating section 23 also transmits, to the displayed area correcting section 25, the displacement direction thus calculated.

The follow-degree deciding section 24 decides, in accordance with the displacement of the image capture subject per unit time, to what degree the image capture subject is followed when a correction is made by the displayed area correcting section 25 (described later). As used herein, the degree to which the image capture subject is followed (hereinafter may be referred to as "follow degree") refers to a value indicative of the ratio of a distance traveled by the displayed area to the displacement of the image capture subject. The degree to which the image capture subject is followed can be set by the follow-degree deciding section 24 at any time intervals. For example, in a case where the displacement-of-subject calculating section 23 calculates the displacement of the image capture subject over one frame period, the follow-degree deciding section 24 can set the degree to which the image capture subject is followed once every frame. Alternatively, the follow-degree deciding section 24 can set the follow degree once every, for example, 30 frames or 60 frames, based on a series of data about the displacements received once every 30 frames or 60 frames.

The follow-degree deciding section 24 decides the follow degree such that the follow degree decreases as the displacement of the image capture subject per unit time increases (details of which will be described later). The follow-degree deciding section 24 transmits the thus-decided follow degree to the displayed area correcting section 25.

The displayed area correcting section 25 specifies the location of the displayed area in each frame of the moving image and corrects the location. The displayed area correcting section 25 first specifies the location of the displayed area in accordance with information that is received by the control section 20 from the sensor 11 and that is indicative of the user's movement. For example, in a case where the sensor 11 transmits information, indicative of a tilt of the user's head, the displayed area correcting section 25 specifies a part of a whole frame image of the moving image as the displayed area, in accordance with the tilt of the head.

Then, the displayed area correcting section 25 corrects the location of the above-specified displayed area in accordance with (i) the displacement and the displacement direction received from the displacement-of-subject calculating section 23 and (ii) the follow degree received from the follow-degree deciding section 24. Specifically, the displayed area correcting section 25 causes the specified displayed area to move by a distance indicated by the follow degree in a direction indicated by the displacement direction.

(Displacement of Image Capture Subject and Follow Degree)

FIG. 2 is a chart showing correlations between displacement of an image capture subject and correction level for a displayed area. As used herein, the term "correction level" refers to a distance to be traveled by the displayed area when the location of the displayed area is corrected. The correction level is obtained by multiplying the displacement of the image capture subject by the follow degree. The vertical axis in the chart shows the correction level for a displayed area. The horizontal axis in the chart shows the displacement of the image capture subject calculated by the displacement-of-subject calculating section 23. Note that, although the values on the vertical and horizontal axes in FIG. 2 are indicated by the numbers 0 to 5, these numbers indicate relative levels/amounts and do not represent any specific coefficients or values.

The chart of FIG. 2 shows the following three correlations: "follow perfectly", "correct relatively strongly", and "correct relatively weakly". As used herein, the term "follow perfectly" means that the displayed area is corrected such that the image capture subject is perfectly followed. That is, in the case of "follow perfectly", the displayed area correcting section corrects the displayed area such that the relative locations of the displayed area and the image capture subject are always constant. Therefore, in the case of "follow perfectly", the follow degree is always constant, and therefore the displacement of the image capture subject and the correction level are directly proportional to each other as shown in FIG. 2.

Note here that the moving image to be displayed on the HMD 100 is, for example, an all-around image with an angle of view of 360°. Therefore, in the case of "follow perfectly", the location of the displayed area greatly changes in some cases. For example, the location of the displayed area in one frame may be 180° different from its location in the frame before. If this is the case, when, for example, the amount of correction of the displayed area is very large (correction level is high), the user who sees this displayed area on the display section 13 can feel like he is making a large movement because of the information obtained through his visual system. The user's body, however, is not actually moving, and therefore there is a significant mismatch between the feeling of very large movement obtained through viewing the displayed area and the feeling of actual movement of the user's body. In addition, in the case where the amount of correction is very large, the user may suffer from digital motion sickness because of the mismatch between the feeling of movement obtained through his visual system and the feeling of actual movement. It is therefore preferable to reduce the above mismatch (between the feeling of movement obtained through visual system and the feeling of actual movement, which are perceived when the user sees the displayed area on the display section 13) to an extent that the sickness will not occur.

Each of the correlations "correct relatively strongly" and "correct relatively weakly" shown in FIG. 2 is a correlation such that the correction level relative to the displacement of the image capture subject is reduced as the displacement of the image capture subject increases. The degree to which the correction level is reduced is greater in the case of the correlation "correct relatively weakly" than in the case of the correlation "correct relatively strongly". That is, in the cases of "correct relatively strongly" and "correct relatively weakly", the follow-degree deciding section 24 decides the follow degree such that the follow degree decreases as the displacement of the image capture subject per unit time increases.

In a case where the displacement of the image capture subject per unit time is large, it is more likely that the subject is actually moving in the moving image than that the moving image itself is blurred. Therefore, as shown in the correlation "correct relatively strongly" and the correlation "correct relatively weakly", the displayed area correcting section 25 decides correction levels based on different follow degrees, and is thereby capable of deciding correction levels that will not result in following the subject to an extent more than enough to correct blur of the moving image.

Incidentally, a change in location of the displayed area, due to correction, occurs regardless of a movement of a line of sight of a user who sees the displayed area. And, if correction levels are decided as shown in the correlation "follow perfectly", the speed of change in location of the displayed area will increase as the displacement of the image capture subject per unit time increases. For example, in a case where the image capture subject is moving at high speed, an actively moving image is presented to the user who sees the displayed area regardless of the movement of the line of sight of the user himself, and the user may suffer from digital motion sickness. In contrast, by setting the correction levels as shown in the correlation "correct relatively strongly" or "correct relatively weakly", it is possible to make a correction of the location of the displayed area while preventing the user from suffering from digital motion sickness.

Note that the degree to which the correction level is reduced in the case of "correct relatively strongly" and that in the case of "correct relatively strongly" can be appropriately set, respectively, and the difference between the two can be set appropriately. For example, the following arrangement can be employed: the degree to which the correction level is reduced in the case of "correct relatively strongly" and that in the case of "correct relatively strongly" can be set appropriately by a user.

(Process Flow)

The following description will discuss a flow of processes carried out by the HMD 100, with reference to FIG. 3. FIG. 3 is a flowchart showing an example of a flow of processes carried out by the HMD 100 in accordance with Embodiment 1. The description with reference to FIG. 3 is based on the assumption that an image of a displayed area in a first frame (which is a frame of a moving image) is being displayed on the display section 13, and the frame that is to be displayed after the first frame is referred to as a second frame.

First, the image acquiring section 21 acquires, from the storage section 12, an image that is to be displayed in the second frame (which is immediately subsequent to the first frame) (S1). Next, the subject specifying section 22 specifies an image capture subject that is contained in the image acquired in S1 and that is for the second frame (S2). Then, the displacement-of-subject calculating section 23 calculates the displacement per unit time of the image capture subject thus specified in S2, from the location of the image capture subject in the first frame and the location of the image capture subject in the second frame (S3).

The follow-degree deciding section 24 decides, based on the displacement calculated in S3, a follow degree (degree to which the image capture subject is followed) for the second frame (S4: follow-degree deciding step). Next, the displayed area correcting section 25 corrects the location of the displayed area in the second frame based on the follow degree thus decided (S6: displayed area correcting step), and then causes the display section 13 to display an image of the thus-location-corrected displayed area of a whole image of the second frame (S6).

According to the above processes, the location of the displayed area is corrected based on the image capture subject that is contained in a moving image, and thereby a change of the moving image itself (blur) can be corrected. Furthermore, the degree to which the subject is followed in the correction is changed in accordance with the displacement per unit time of the image capture subject, and therefore it is possible to correct the location of the displayed area with an appropriate follow degree that allows a user to watch the moving image comfortably.

For example, it is possible, based on the displacement of the image capture subject, to correct the displayed area with use of a follow degree that is suitable for whether (i) the image capture subject is changing in its location in the moving image because the moving image itself is blurred or (ii) the image capture subject is actually moving in the moving image. This allows a user to watch the moving image more comfortably.

Embodiment 2

Figure 4:
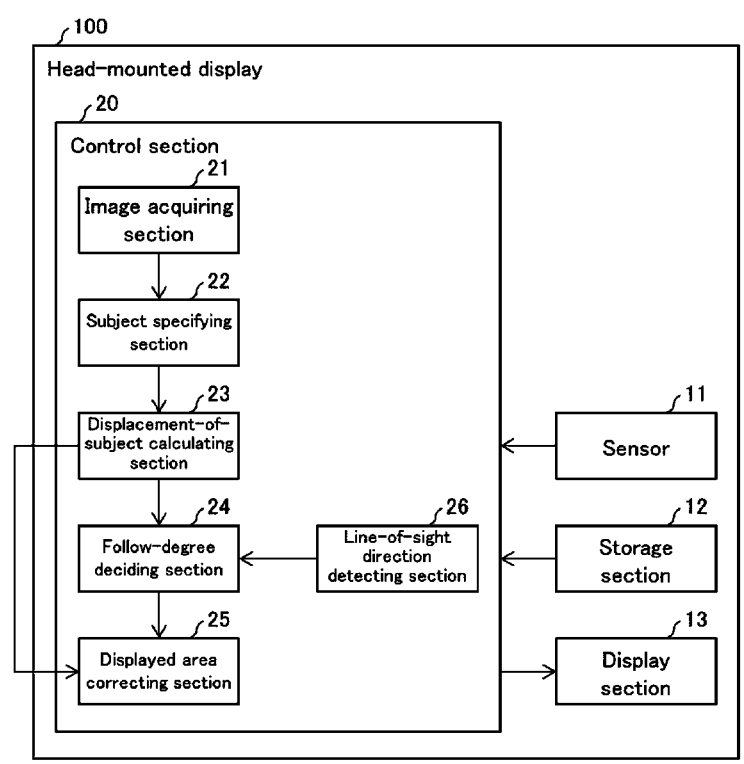
FIG. 4 is a block diagram illustrating an example configuration of main parts of a head-mounted display in accordance with Embodiment 2 of the present invention.
Figure 5:
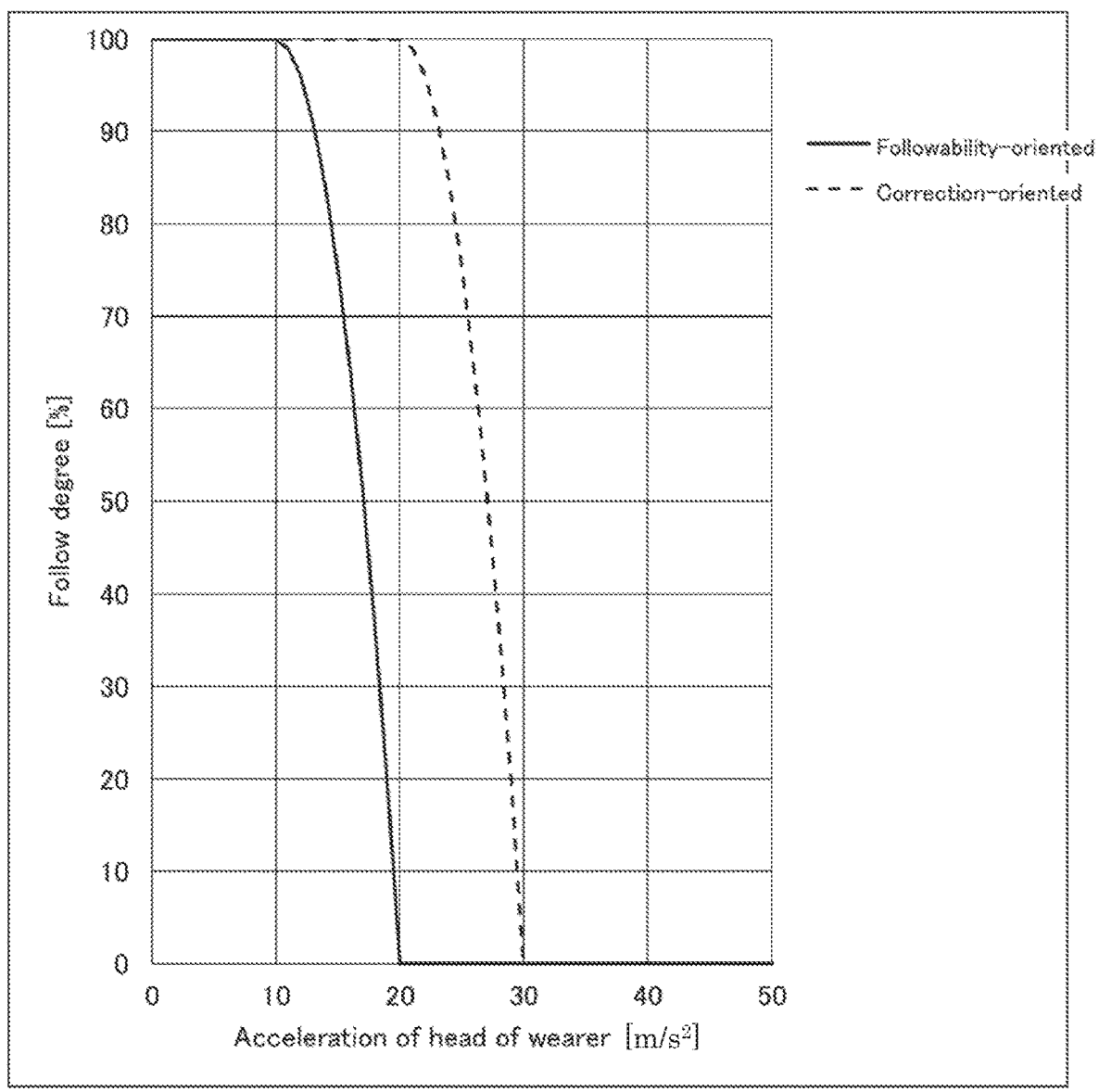
FIG. 5 is a chart showing correlations between acceleration of a user's head and correction level.

The following description will discusses Embodiment 2 of the present invention with reference to FIGS. 4 to 6. For convenience of description, members having functions identical to those described in Embodiment 1 are assigned identical referential numerals, and their descriptions are omitted here.

(Configuration of Head-Mounted Display)

The following description will discuss a configuration of an HMD 200 in accordance with Embodiment 2 with reference to FIG. 4. FIG. 4 is a block diagram illustrating an example configuration of main parts of the HMD 200 in accordance with Embodiment 2. The HMD 200 in accordance with Embodiment 2 is different from the HMD 100 in accordance with Embodiment 1 in that the HMD 200 calculates the speed of change in direction of a line of sight of a user from a movement of the head of the user detected by the sensor (such a speed is hereinafter referred to as "line-of-sight change speed") and takes the speed into consideration in making a correction of a displayed area.

The HMD 200 includes a line-of-sight direction detecting section 26 in addition to the features of the HMD 100. The line-of-sight direction detecting section 26 determines the line-of-sight change speed based on information indicative of the user's movement (for example, acceleration of the user's head) received from the sensor 11. For example, the line-of-sight direction detecting section 26 is capable of determining the amount of change in direction of a line of sight per unit time (i.e., line-of-sight change speed) by multiplying the acceleration of the user's head by unit time. The line-of-sight direction detecting section 26 transmits the information indicative of the line-of-sight change speed to the follow-degree deciding section 24.

The follow-degree deciding section 24 decides a degree to which an image capture subject is followed when the location of the displayed area is corrected, in accordance with the line-of-sight change speed determined by the line-of-sight direction detecting section 26 and the displacement per unit time of the image capture subject. The follow-degree deciding section 24 transmits the thus-decided follow degree to the displayed area correcting section 25.

(Acceleration of User'S Head and Follow Degree)

FIG. 5 is a chart showing correlations between acceleration of the user's head and correction level for the HMD 200 in accordance with Embodiment 2.

FIG. 5 is a chart showing correlations between the acceleration of the user's head and follow degree. The vertical axis in the chart represents the follow degree expressed in percentage. The horizontal axis of the chart represents the acceleration of the user's head per unit time (i.e., line-of-sight change speed). Note that the values and the correlations in FIG. 5 are mere examples, arid are not intended to impose any limitation on processes carried out by and configurations of the HMD 200 in accordance with Embodiment 2.

The chart of FIG. 5 shows the following two correlations: "followability-oriented"; and "correction oriented". As shown in FIG. 5, in either correlation, the followability decreases as the amount of change in direction of a line of sight per unit time increases.

With regard to a moving image, in the correlation in the case of "followability-oriented" shown in FIG. 5, when the acceleration of the user's head is "10 m/s$^2$", the degree to which the location of the displayed area follows the image capture subject is "100%" relative to the displacement per unit time of the image capture subject. On the contrary, after the acceleration of the user's head exceeds "10 m/s$^2$", the follow degree decreases, arid the follow degree is "0%" when the acceleration of the user's head is "20 m/s$^2$".

The following is a reason that the follow degree is set to "0%" when the acceleration of the user's head is greater than "20 m/s$^2$". While the user is actively moving his head, the user is probably not gazing at a moving image that is being displayed on the display section 13. In other words, in a case where the head is moving actively, even if the moving image is blurred, the user probably cannot perceive such blur. This can mean that when the acceleration of the user's head is large, a correction of the blurred moving image will not provide a great effect. Accordingly, the HMD 200 is arranged not to correct the location of the displayed area when the acceleration of the user's head is, for example, equal to or greater than "20 m/s$^2$". This will result in excess computing resource, which can be used to carry out some other control process related to display control.

According to the above arrangement, the HMD 200 (i) is capable of correcting the location of the displayed area based on the displacement of the image capture subject in a case where the acceleration of the user's head is less than "20 m/s$^2$" and (ii) does not cause the displayed area to follow the subject in a case where the acceleration of the user's head is equal to or greater than "20 m/s$^2$".

In the case of the correlation "correction-oriented", when the acceleration of the user's head is equal to or less than "20 m/s$^2$", the degree to which the location of the displayed area follows the image capture subject is "100%" relative to the displacement per unit time of the image capture subject. On the contrary, after the acceleration of the user's head exceeds "20 m/s$^2$", the follow degree sharply decreases, and the follow degree is "0%" when the acceleration of the user's head is "30 m/s$^2$". That is, in the case of "correction-oriented", the displayed area is caused to follow the subject even in cases where the acceleration of the head is greater than in the case of "followability-oriented". Then, when the acceleration of the user's head becomes equal to or greater than "30 m/s$^2$", the displayed area is caused to stop following the subject. That is, the correlation "correction-oriented" is the same as the correlation "followability-oriented" in that delays in displaying frames are prevented or reduced within this range.

Note that, as described above, the HMD 200 can be arranged to decide whether or not to make a correction in accordance with whether or not the acceleration of the head is equal to or greater than a predetermined threshold (20 m/s$^2$ in the case of "followability-oriented", 30 m/s$^2$ in the case of "correction-oriented"). The displayed area correcting section 25 can be arranged to make a correction such that the follow degree decreases as the acceleration of the head increases (as the movement becomes quicker).

As described earlier, it can be said that, as the acceleration of the user's head (i.e., the line-of-sight change speed) increases, the user is less likely to be gazing at an image displayed on a display screen (that is, the image of the displayed area). In the case where the user is not gazing at the display screen, even if the moving image is blurred, the user will unlikely perceive such blur. In view of this, the above arrangement makes it possible to prevent the location of the displayed area from changing too much by reducing the follow degree, when the user is unlikely to perceive the blur of the moving image. This allows the user to watch the moving image more comfortably while preventing the user from suffering from digital motion sickness.

(Process Flow)

The following description will discuss a flow of processes carried out by the HMD 200, with reference to FIG. 6. FIG. 6 is a flowchart showing an example of a flow of processes carried out by the HMD 200 in accordance with Embodiment 2. The first frame and the second frame in Embodiment 2 are as defined for FIG. 3 of Embodiment 1.

After the same processes as S1 and S2 in FIG. 3 are carried out, the line-of-sight direction detecting section 26 determines the acceleration of the head of a user through use of the sensor 11 (S11). Then, the control section 20 carries out the process of S3 in the same manner as in Embodiment 1, and then the line-of-sight direction detecting section 26 calculates the amount of change in acceleration of the user's head per unit time based on (i) the acceleration of the user's head detected in S11 and (i) the acceleration of the user's head obtained the first frame was displayed (S12).

After S12, the follow-degree deciding section 24 determines whether or not the amount of change in acceleration of the user's head per unit time (i.e., line-of-sight change speed) calculated in S12 is equal to or greater than a predetermined threshold (S13). If it is determined that the line-of-sight change speed is less than the predetermined threshold (NO in S13), the control section 20 carries out the processes of S4 to S6 in the same manner as in Embodiment 1, and then ends a series of processes. On the contrary, if it is determined that the line-of-sight change speed is equal to or greater than the predetermined threshold (YES in S13), the control section 20 does not cause the displayed area correcting section 25 to make a correction of the location of the displayed area, and cause the display section 13 to display an image corresponding to a displayed area in the second frame (S6), and ends a series of processes.

Through the above processes, the HMD 200 in accordance with Embodiment 2 is capable of deciding an appropriate correction level based on the displacement of the image capture subject per unit time and the line-of-sight change speed. This provides the following effect: when a user changes the direction of his line of sight in anticipation of a change in a moving image, the user perceives a moving image that has been corrected based on a follow degree appropriately decided in a way that prevents discomfort.

The HMD 200 in accordance with Embodiment 2 can be arranged such that the HMD 200 does not correct the location of the displayed area in a case where the line-of-sight change speed is greater than a predetermined threshold. With this arrangement, the HMD 200 does not need to allocate its capacity to a correction of the location of the displayed area, and thus can allocate more capacity to displaying the moving image.

The above description deals with an arrangement in which the line-of-sight direction detecting section 26 determines the line-of-sight change speed based on the acceleration of the user's head. The line-of-sight direction detecting section 26, however, can be arranged to calculate the line-of-sight change speed by any calculation method, provided that the line-of-sight change speed can be determined. For example, the line-of-sight direction detecting section 26 can be arranged to (i) calculate the displacement per unit time of a point of gaze of a user on a display surface of the display section 13 and (ii) use this as the speed of change in direction of the line of sight.

Embodiment 3

The HMD 100 or HMD 200 in accordance with Embodiment 1 or Embodiment 2 can be arranged such that the follow-degree deciding section 24 decides the follow degree in accordance with content of a moving image. As used herein, the content of a moving image is, for example, live video of an artist (hereinafter referred to as live video for short), game screen, scenic video, or the like. The content of a moving image can be determined by analysis of the moving image by the image acquiring section 21 or the like when the moving image to be displayed is decided or may be pre-set on per-moving-image basis.

The following description will discuss, as an aspect of the present invention, an HMD 100 that decides the follow degree in accordance with the content of a moving age, with reference to FIG. 2 and FIGS. 5 and 6. Note that, for convenience of description, the following description deals with an example in which an arrangement in accordance with Embodiment 3 is employed in the HMD 100 in accordance with. Embodiment 1. The arrangement in accordance with Embodiment 3, however, can also be employed in the HMD 200 in accordance with Embodiment 2.

(Content of Moving Image and Follow Degree)

The following first discusses setting of an appropriate correction level suitable for the content of a moving image, with reference to FIG. 2.

Assume that the moving image is live video. In a case where the live video is displayed on the HMD 100 or 200 and presented to a user, the user may want to have an artist in the video within his sight.

Therefore, in the case where the moving image is live video, it is preferable that the artist is pre-set as an image capture subject and, in addition, the location of a displayed area is corrected based on, for example, the data of "correct relatively strongly" shown in FIG. 2. This makes it possible to ensure that the artist is followed.

On the contrary, assume that the moving image is a game screen. The game screen changes mainly in response to a user's control, and the user's control may be carried out a plurality of times within a short period of time. Therefore, in the case where the moving image is a game screen, the user may prefer a good response to his control in the game, such as screen switching or movement of the viewpoint, to following a specific subject.

Accordingly, in the case where the moving image is a game screen, it is preferable that the displayed area correcting section 25 corrects the location of displayed area based on, for example, the data of "correct relatively weakly" shown in FIG. 2. This reduces the correction level, and thus makes it possible to prevent sacrifice of the user's playability.

According to the above processes, it is possible to correct the location of the displayed area with use of appropriate correction levels suitable for the content of the moving image. For example, in a case where the moving image is live video, when an artist is set as the image capture subject and the degree to which the image capture subject is followed in the correction of the location of the displayed area is increased, the HMD 100 or 200 is capable of displaying the moving image in which it is ensured that the artist is followed.

On the contrary, in a case where the moving image is a game screen, by reducing the degree to which the subject is followed, it is possible to give more priority to a display intended by a user (i.e., a game player) than to following the image capture subject. More specifically, the HMD 100 or 200 is capable of, for example, displaying a moving image in accordance with changes of displayed areas that would result from the user's control in the game such as screen switching or movement of the viewpoint, instead of ensuring that the image capture subject is followed.

In a case where the arrangement in accordance with Embodiment 3 is employed in the HMD 200 (Embodiment 2), the HMD 200 can be arranged to change the threshold of the line-of-sight change speed (the predetermined threshold described in Embodiment 2) in accordance with the content of a moving image. This makes it possible for the HMD 200 to appropriately determine, in accordance with the content of the moving image, whether to give priority to reduction of processing load related to displaying or to give priority to following the image capture subject.

(Process Flow)

The following description will discuss a flow of processes carried out when the arrangement in accordance with Embodiment 3 is employed in the HMD 200, with reference to FIG. 6. The first frame and the second frame in Embodiment 3 are as defined for FIG. 3 of Embodiment 1 and FIG. 6 of Embodiment 2

After the processes of S1, S2, S11, S3, and S12 shown in FIG. 6 are carried out in the same manner as described in Embodiment 2, the follow-degree deciding section 24 determines whether or not the amount of change in line-of-sight change speed per unit time is greater than a predetermined threshold that depends on the content of a moving image. In so doing, if it is determined that the amount of change is less than the predetermined threshold that depends on the content of the moving image, the follow-degree deciding section 24 decides the follow degree for the image as a whole which contains the image capture subject for the second frame, based on the displacement of the image capture subject per unit time, the line-of-sight change speed, and the content of the moving image. Then, the control section 20 carries out the processes of S5 and S6 in the same manner as described in Embodiment 2, and ends a series of processes. On the contrary, if it is determined that the amount of change is equal to or greater than the predetermined threshold that depends on the content of the moving image, the control section 20 carries out the process of S6 and ends a series of processes.

(Variation)

Embodiments 1 to 3 deal with the HMD 100 and the HMD 200 each of which includes the display control device (control section 20); however, a display control device in accordance with an aspect of the present invention can be used for display control other than those of the HMD 100 and the HMD 200. For example, the display control device can be used for display control of a display device such as a projector.

Note that the projector can include a sensor group that detects a user's line of sight (location of a point of gaze on a display surface of the projection display) serving as a sensor 11 connected to the projector and thereby achieve the arrangement of and the processes carried out by the HMD 200. The sensor group can be comprised of sensors that realize an existing eye-tracking tracking function.

[Software Implementation Example]

Control blocks of the control section 20 (particularly, the follow-degree deciding section 24 and the displayed area correcting section 25) can be realized by a logic circuit (hardware) provided in an integrated circuit (IC chip) or the like or can be alternatively realized by software as executed by a central processing unit (CPU).

In the latter case, the control section 20 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows:

A display control device (control section 20) in accordance with Aspect 1 of the present invention is a display control device for controlling a display section to display a part of a frame image of a moving image, the part being used as a displayed area, the display control device including: a displayed area correcting section (25) configured to make a correction of a location of the displayed area in the frame image so as to follow a specific subject (image capture subject) contained in the moving image; and a follow-degree deciding section (24) configured to decide, in accordance with a displacement of the specific subject per unit time in the moving image, a degree to which the specific subject is followed in the correction made by the displayed area correcting section.

According to the above arrangement, it is possible to correct blur of the moving image itself based on a specific subject contained in the moving image. Since the degree to which the subject is followed in the correction is changed in accordance with the displacement of the specific subject per unit time, it is also possible to correct the location of the displayed area with use of appropriate follow degrees that allow a user to watch the moving image comfortably.

For example, it is possible, based on the displacement, to correct the displayed area with use of a follow degree that is suitable for (i) a state in which the moving image itself is blurred and therefore the subject looks like it is changing its location or (ii) a state in which the subject is actually moving in the moving image. This allows a user to watch the moving image more comfortably.

A display control device in accordance with Aspect 2 of the present invention can be arranged such that, in Aspect 1, the follow-degree deciding section is configured to decide the degree such that the degree decreases as the displacement of the specific subject per unit time increases.

In a case where the displacement of the specific subject per unit time is large, it is more likely that the subject actually moves in the moving image than that the moving image itself is blurred. The above arrangement therefore makes it possible to prevent the subject from being followed to an extent that is more than enough to correct blur of the moving image.

Furthermore, a change in location of the displayed area, due to correction, occurs regardless of the movement of a line of sight of a user who sees the displayed area. And, if the subject is perfectly followed in the correction, the speed of change in location of the displayed area will increase as the displacement of the subject per unit time increases. For example, in a case where the subject moves at high speed, an actively moving image is presented to the user who sees the displayed area regardless of the movement of the line of sight of the user himself, and the user likely suffers from digital motion sickness.

In contrast, according to the above arrangement, the degree to which the subject is followed is reduced as the displacement of the subject per unit time increases. This makes it possible to make a correction of the location of the displayed area while preventing the user from suffering from the foregoing digital motion sickness.

A display control device in accordance with Aspect 3 of the present invention can be arranged such that, in Aspect 1 or 2, the display control device further includes a line-of-sight direction detecting section (26) configured to detect a speed of change in direction of a user's line of sight, and the follow-degree deciding section is configured to decide the degree such that the degree decreases as the speed increases.

It can be said that, when the speed of change in direction of line of sight is high, the user is not gazing at an image displayed on a display screen (that is, the image of the displayed area) of a display section. In the case where the user is not gazing at the display screen, even if the moving image is blurred, the user will unlikely perceive such blur. In view of this, the above arrangement makes it possible to prevent the location of the displayed area from changing too much by reducing the follow degree, when the user is unlikely to perceive the blur of the moving image. This allows the user to watch the moving image more comfortably while preventing the user from suffering from digital motion sickness.

A display control device in accordance with Aspect 4 of the present invention can be arranged such that, in Aspect 3, the displayed area correcting section is configured such that, in a case where the speed detected by the line-of-sight direction detecting section is equal to or greater than a predetermined threshold, the displayed area correcting section does not make the correction of the location of the displayed area.

In the case where the speed of change in direction of lire of sight is equal to or greater than the threshold, even if the moving image is blurred, the user will unlikely perceive such blur.

In view of this, according to the above arrangement, a correction of blur of the moving image is not made when the correction does not provide a great effect, and thereby a computing resource which used to be allocated to the correction can be allocated to some other process related to display control. This makes it possible to effectively distribute limited computing resources, and thus possible to prevent delays in displaying the moving image that would result from shortage of computing resources and thus possible to allow the user to watch the moving image more comfortably.

A display control device in accordance with Aspect 5 of the present invention can be arranged such that, in any one of Aspects 1 through 4, the follow-degree deciding section is configured to decide, in accordance with content of the moving image, the degree to which the specific subject is followed.

According to the above arrangement, it is possible to correct the location of the displayed area with use of appropriate correction levels suitable for the content of the moving image.

For example, in a case where the moving image is live video of a specific artist, the artist is set as a specific subject, and the degree to which the subject is followed in the correction of the location of the displayed area is increased. It is thereby possible to ensure that the artist is followed.

On the contrary, in a case where the moving image is a game screen, the degree to which a subject is followed is reduced, and thereby it is possible to give more priority to a display intended by a user (i.e., a game player) than to following the subject. More specifically, it is possible to decide the displayed area by giving priority to, for example, the user controls in the game such as screen switching or movement of the viewpoint.

A head-mounted display (HMD 100) in accordance with Aspect 6 of the present invention can include: a display control device (control section 20) recited in any one of Aspects 1 through 5; the display section (display section 13); and a displayed area deciding section (displayed area correcting section 25) configured to decide a displayed area in accordance with an orientation of a user's head.

According to the above arrangement, the head-mounted display is capable of causing the display section to display an area which is part of the moving image, which corresponds to the orientation of the head of the wearer of the head-mounted display, and in which blur of the moving image itself has been corrected based on a specific subject in the moving image. Accordingly, the head-mounted display allows the user to watch the moving image more comfortably.

A method of controlling a display control device in accordance with Aspect 7 of the present invention is a method of controlling a display control device section 20) that is configured to control a display section (display section 13) to display a part of a frame image of a moving image, the part being used as a displayed area, the method including: a displayed area correcting step (S5) including making a correction of a location of the displayed area in the frame image so as to follow a specific subject (image capture subject) contained in the moving image; and a follow-degree deciding step (S4) including deciding, in accordance with a displacement of the specific subject per unit time in the moving image, a degree to which the specific subject is followed in the correction made in the displayed area correcting step. This arrangement provides similar effects to those provided by the display control device in accordance with Aspect 1.

A display control device in accordance with each aspect of the present invention can be realized by a computer. The computer is operated based on (i) a control program for causing the computer to realize the display control device by causing the computer to operate as each section (software element) included in the display control device and (ii) a computer-readable storage medium in which the control program is stored. Such a control program and a computer-readable storage medium are included in the scope of the present invention.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST 100 head-mounted display
11 sensor
12 storage section
13 display section
20 control section (display control device)
21 image acquiring section
22 subject specifying section
23 displacement-of-subject calculating section
24 follow-degree deciding section
25 displayed area correcting section (displayed area deciding section)
26 line-of-sight direction detecting section

The invention claimed is:

1. A display control device for controlling a display section to display a part of a frame image of a moving image, the part being used as a displayed area, said display control device comprising:

a displayed area correcting section configured to make a correction of a location of the displayed area in the frame image such that the displayed area follows a specific subject contained in the moving image; and
a follow-degree deciding section configured to:
decide, in accordance with a displacement of the specific subject per unit time in the moving image, a degree to which the specific subject is followed in the correction made by the displayed area correcting section; and
decide the degree to which the specific subject is followed in the correction made by the displayed area correcting section, change the degree such that the degree decreases as the displacement increases, and transmit the changed degree to the displayed area correcting section, wherein:
a correlation "correct relatively strongly" and a correlation "correct relatively weakly" are set for the degree to which the specific subject is followed, the correlation "correct relatively strongly" different from the correlation "correct relatively weakly" with regard to a degree to which a level of the correction relative to the displacement is reduced as the displacement increases; and
the follow-degree deciding section is further configured to decide the degree to which the specific subject is followed in accordance with the correlation "correct relatively strongly" or the correlation "correct relatively weakly".

2. The display control device according to claim 1, further comprising:
a line-of-sight direction detecting section configured to detect a speed of change in a direction of a user's line of sight,
wherein the follow-degree deciding section is further configured to decide the degree such that the degree decreases as the speed increases.

3. The display control device according to claim 2, wherein the displayed area correcting section is further configured such that, in a case where the speed of change detected by the line-of-sight direction detecting section is equal to or greater than a predetermined threshold, the displayed area correcting section does not make the correction of the location of the displayed area.

4. The display control device according to claim 1, wherein the follow-degree deciding section is configured to decide, in accordance with content of the moving image, the degree to which the specific subject is followed.

5. A head-mounted display comprising:
a display control device recited in claim 1;
the display section; and
a displayed area deciding section configured to decide a displayed area in accordance with an orientation of a user's head.

6. A method of controlling a display control device that is configured to control a display section to display a part of a frame image of a moving image, the part being used as a displayed area, said method comprising:
a displayed area correcting step comprising making a correction of a location of the displayed area in the frame image such that the displayed area follows a specific subject contained in the moving image; and
a follow-degree deciding step comprising deciding, in accordance with a displacement of the specific subject per unit time in the moving image, a degree to which the specific subject is followed in the correction made by the displayed area correcting step, wherein:

in the follow-degree deciding step, the degree to which the specific subject is followed in the correction made in the displayed area correcting step is decided and the degree is changed such that the degree decreases as the displacement increases;

a correlation "correct relatively strongly" and a correlation "correct relatively weakly" are set for the degree to which the specific subject is followed, the correlation "correct relatively strongly" different from the correlation "correct relatively weakly" with regard to a degree to which a level of the correction relative to the displacement is reduced as the displacement increases; and the follow-degree deciding section is further configured to decide the degree to which the specific subject is followed in accordance with the correlation "correct relatively strongly" or the correlation "correct relatively weakly".

7. A non-transitory computer-readable storage medium storing therein a control program for controlling a computer to carry out a method of controlling a display control device recited in claim 6.

\* \* \* \* \*